(12) United States Patent
Bastian et al.

(10) Patent No.: US 11,019,123 B2
(45) Date of Patent: May 25, 2021

(54) MULTI-BITRATE COMPONENT SHARDING

(71) Applicant: INTERNATIONAL BUSINESS MACHINES CORPORATION, Armonk, NY (US)

(72) Inventors: David Bastian, Dupage, IL (US); Aaron K. Baughman, Silver Spring, MD (US); Nicholas A. McCrory, Sacramento, CA (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 16/015,830

(22) Filed: Jun. 22, 2018

(65) Prior Publication Data

US 2019/0394250 A1   Dec. 26, 2019

(51) Int. Cl.
*H04L 29/06* (2006.01)
*G10L 19/00* (2013.01)

(52) U.S. Cl.
CPC .......... *H04L 65/4092* (2013.01); *G10L 19/00* (2013.01); *H04L 65/60* (2013.01)

(58) Field of Classification Search
CPC ..... H04L 65/4092; H04L 65/60; H04L 65/80; H04L 65/4084; H04L 65/403; H04L 65/607; H04L 29/06; G10L 19/00; G10L 19/167; G10L 19/22
USPC ............... 709/217; 340/16.1; 375/219; 711/1
See application file for complete search history.

(56) References Cited

U.S. PATENT DOCUMENTS

| 5,953,506 | A | * | 9/1999 | Kalra | G06T 3/4092 345/428 |
|---|---|---|---|---|---|
| 7,593,333 | B2 | | 9/2009 | Li et al. | |
| 7,783,773 | B2 | | 8/2010 | Wu et al. | |
| 7,835,437 | B1 | * | 11/2010 | Zhang | H04N 21/23608 375/240.03 |
| 8,379,851 | B2 | | 2/2013 | Mehrotra et al. | |
| 9,178,535 | B2 | | 11/2015 | Luby et al. | |
| 9,445,136 | B2 | | 9/2016 | Gillies et al. | |
| 2002/0161911 | A1 | | 10/2002 | Pinckney, III et al. | |

(Continued)

OTHER PUBLICATIONS

Peter Mell et al, The NIST Definition of Cloud Computing, National Institute of Standards and Technology, Publication 800-145, 2011, entire document.

(Continued)

*Primary Examiner* — Minh Chau Nguyen
*Assistant Examiner* — Mehulkumar J Shah
(74) *Attorney, Agent, or Firm* — Patrick J. Daugherty; Daugherty & Del Zoppo Co., LPA

(57) ABSTRACT

Embodiments provide for multi-bit rate component sharding, wherein processors are configured to identify respective sizes of each of different data partitions of a totality of content data of a moving picture experts group format file, the content data including audio data or video data. The processor is configured to determine bandwidth capacities for each of different telecommunication channels that are available to send the file content data to a designated recipient device; partition the file content data into differently-sized data groups, each of including audio data or video data; and differentially rout the data groups to ones of the channels as a function of matching data group data sizes to the channel bandwidth capacities.

17 Claims, 4 Drawing Sheets

(56) References Cited

U.S. PATENT DOCUMENTS

| | | | | |
|---|---|---|---|---|
| 2002/0174434 | A1* | 11/2002 | Lee | H04N 21/64792 725/74 |
| 2003/0231661 | A1* | 12/2003 | DePietro | H04L 29/06 370/474 |
| 2004/0045030 | A1* | 3/2004 | Reynolds | H04L 65/604 725/110 |
| 2004/0125777 | A1* | 7/2004 | Doyle | H04W 48/18 370/338 |
| 2006/0007947 | A1 | 1/2006 | Li et al. | |
| 2008/0022005 | A1 | 1/2008 | Wu et al. | |
| 2008/0256418 | A1 | 10/2008 | Luby et al. | |
| 2009/0282162 | A1 | 11/2009 | Mehrotra et al. | |
| 2011/0219138 | A1* | 9/2011 | Cho | H04L 65/607 709/231 |
| 2013/0041808 | A1 | 2/2013 | Pham et al. | |
| 2013/0070839 | A1 | 3/2013 | Magee | |
| 2013/0103849 | A1* | 4/2013 | Mao | H04N 21/6332 709/231 |
| 2013/0311612 | A1 | 11/2013 | Dickinson | |
| 2017/0373984 | A1* | 12/2017 | Sarapure | H04L 43/0894 |
| 2019/0052937 | A1* | 2/2019 | Malamal Vadakital | H04L 65/604 |

OTHER PUBLICATIONS

Egilmez, Hilmi E., et al., "OpenQoS: An OpenFlow Controller Design for Multimedia Delivery with End-to-End Quality of Service over Software-Defined Networks," entire document.

Thang, Truong Cong, et al., "Adaptive Streaming of Audiovisual Content using MPEG DASH," IEEE Transactions on Consumer Electronics 58, No. 1, 2012, entire document.

Stockhammer, Thomas, "Dynamic Adaptive Streaming over HTTP—Standards and Design Principles," 2nd Annual ACM Conference on Multimedia Systems, ACM, 2011, entire document.

Hwang, Kyung-Wook, et al., "Joint-Family: Adaptive Bitrate Video-on-Demand Streaming over Peer-to-Peer Networks with Realistic Abandonment Patterns," Computer Networks, 2016, entire document.

Loi Luu et al, "A Secure Sharding Protocol for Open Blockchains", ACM, 2016, entire document.

Manish Sharma et al, High-altitude platform for free-space optical communication: Performance evaluation and reliability analysis, http://eeexplore.ieee.org/document/7541958, 2016, abstract.

\* cited by examiner

MULTI-BITRATE COMPONENT SHARDING

BACKGROUND

Aspects of the present invention relate to methods, devices and systems for streaming digital data to devices for the continuous processing of digital data content.

"Streaming digital data" refers to the process of delivering or obtaining digital data on a continuous basis, wherein an end-user media player or other device can start processing the data before an entire file containing the content has been transmitted. Examples include executing speech recognition, computer vision algorithms, etc.; and rendering and displaying multimedia content such as audio and/or video content of a digital file of a movie or song. Streaming is an alternative to "file downloading," a process in which a recipient obtains an entire file before processing or presenting the content therein.

Multi-bitrate streaming improves a viewer's experience by enabling the ability to deliver videos with the resolution and bit-rate that best matches the viewer's connection speed, wherein a streaming device or service provider creates multiple renditions of a given video, each being a different file size, granting the ability for viewers with slower connection speeds to view smaller size files. Multi-bitrate streaming allows for viewers with a variety of downstream connection speeds to watch online video at the highest resolution that is supported by their connection (for example, 1080p, 720p, 576p, 480p or 240p), and thereby experience the least amount of interruption.

SUMMARY

In one aspect of the present invention, a computerized method for multi-bit rate component sharding includes executing steps on a computer processor. Thus, a computer processor is configured to identify respective sizes of each of different data partitions of a totality of content data of a moving picture experts group format file, the content data including audio data or video data. The processor is configured to determine bandwidth capacities for each of different telecommunication channels that are available to send the file content data to a designated recipient device; partition the file content data into differently-sized data groups, each of including audio data or video data; and differentially rout the data groups to ones of the channels as a function of matching data group data sizes to the channel bandwidth capacities.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to identify respective sizes of each of different data partitions of a totality of content data of a moving picture experts group format file, the content data including audio data or video data. The processor is configured to determine bandwidth capacities for each of different telecommunication channels that are available to send the file content data to a designated recipient device; partition the file content data into differently-sized data groups, each of including audio data or video data; and differentially rout the data groups to ones of the channels as a function of matching data group data sizes to the channel bandwidth capacities.

In another aspect, a computer program product for multi-bit rate component sharding has a computer-readable storage medium with computer readable program code embodied therewith. The computer readable hardware medium is not a transitory signal per se. The computer readable program code includes instructions for execution which cause the processor to identify respective sizes of each of different data partitions of a totality of content data of a moving picture experts group format file, the content data including audio data or video data. The processor is caused to determine bandwidth capacities for each of different telecommunication channels that are available to send the file content data to a designated recipient device; partition the file content data into differently-sized data groups, each of including audio data or video data; and differentially rout the data groups to ones of the channels as a function of matching data group data sizes to the channel bandwidth capacities.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
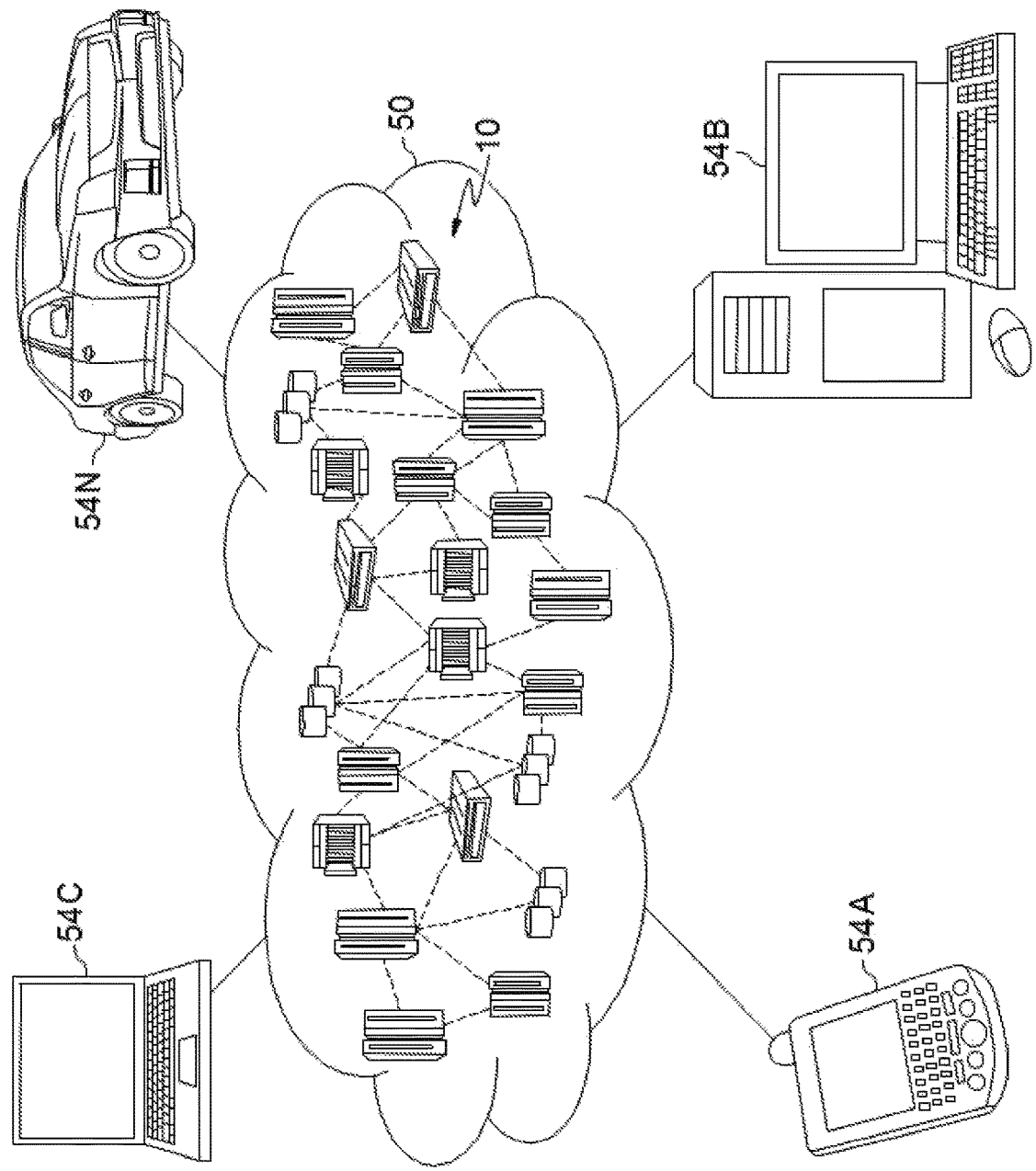
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
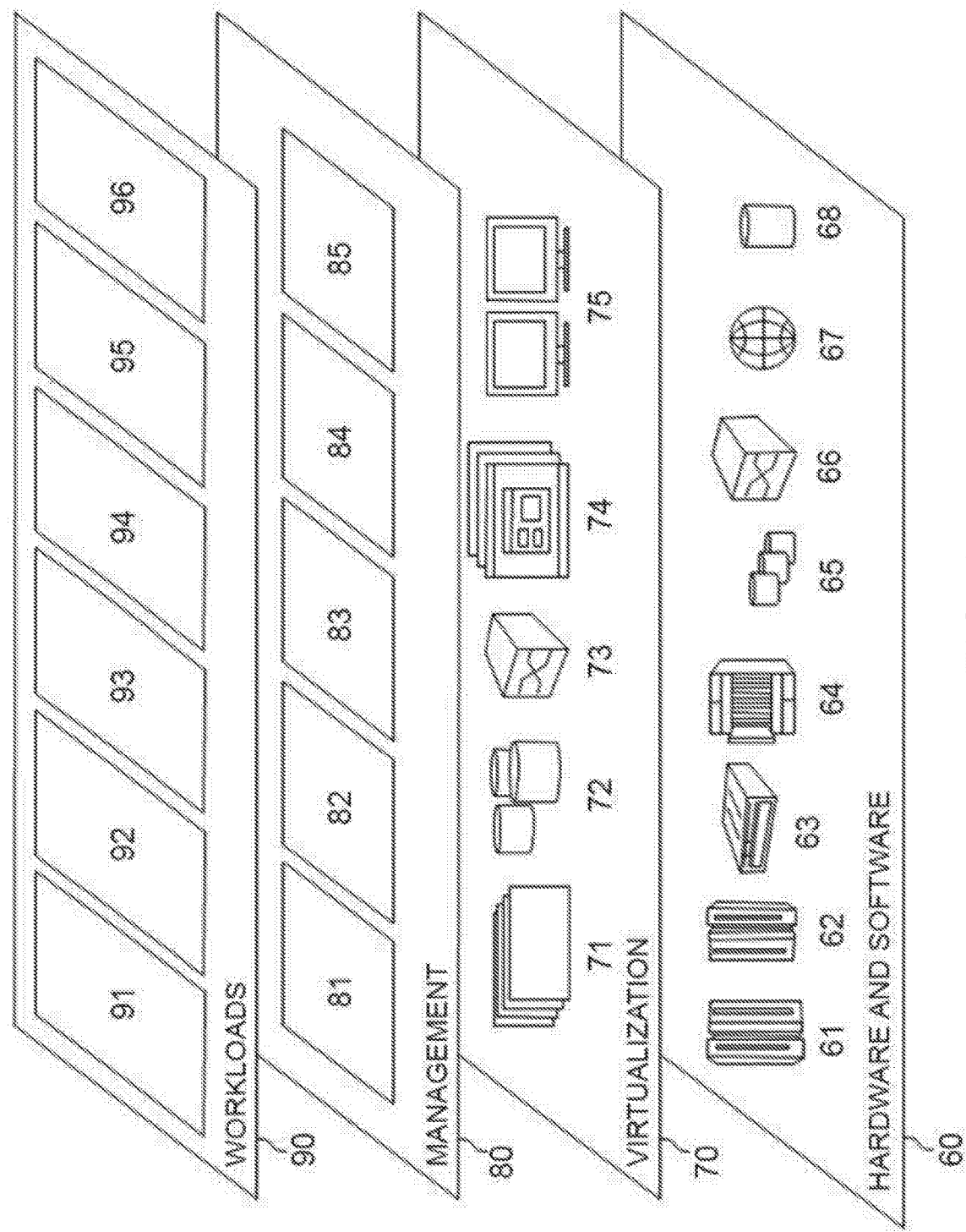
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for multi-bit rate component sharding according to aspects of the present invention 96.

Figure 3:
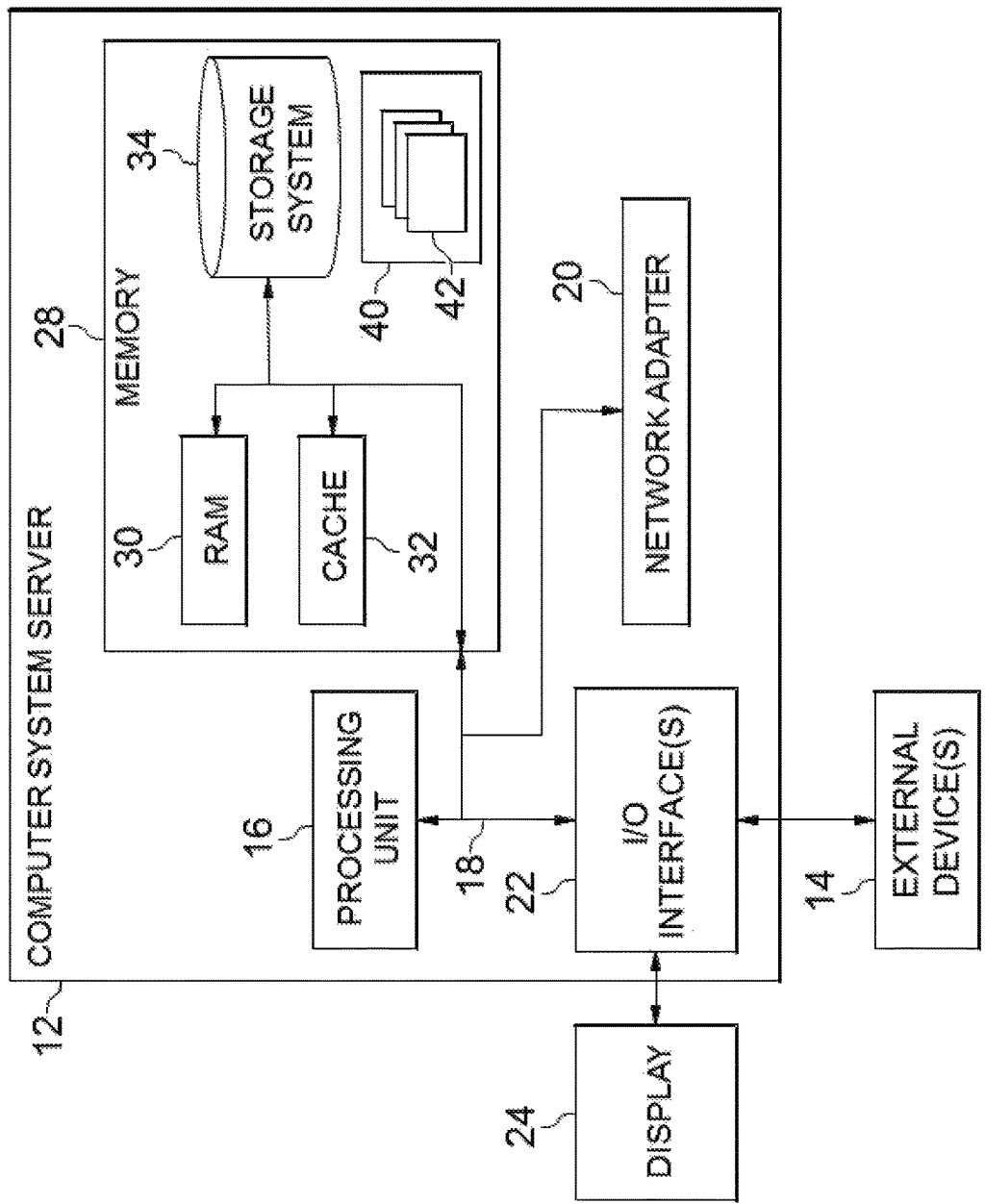
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
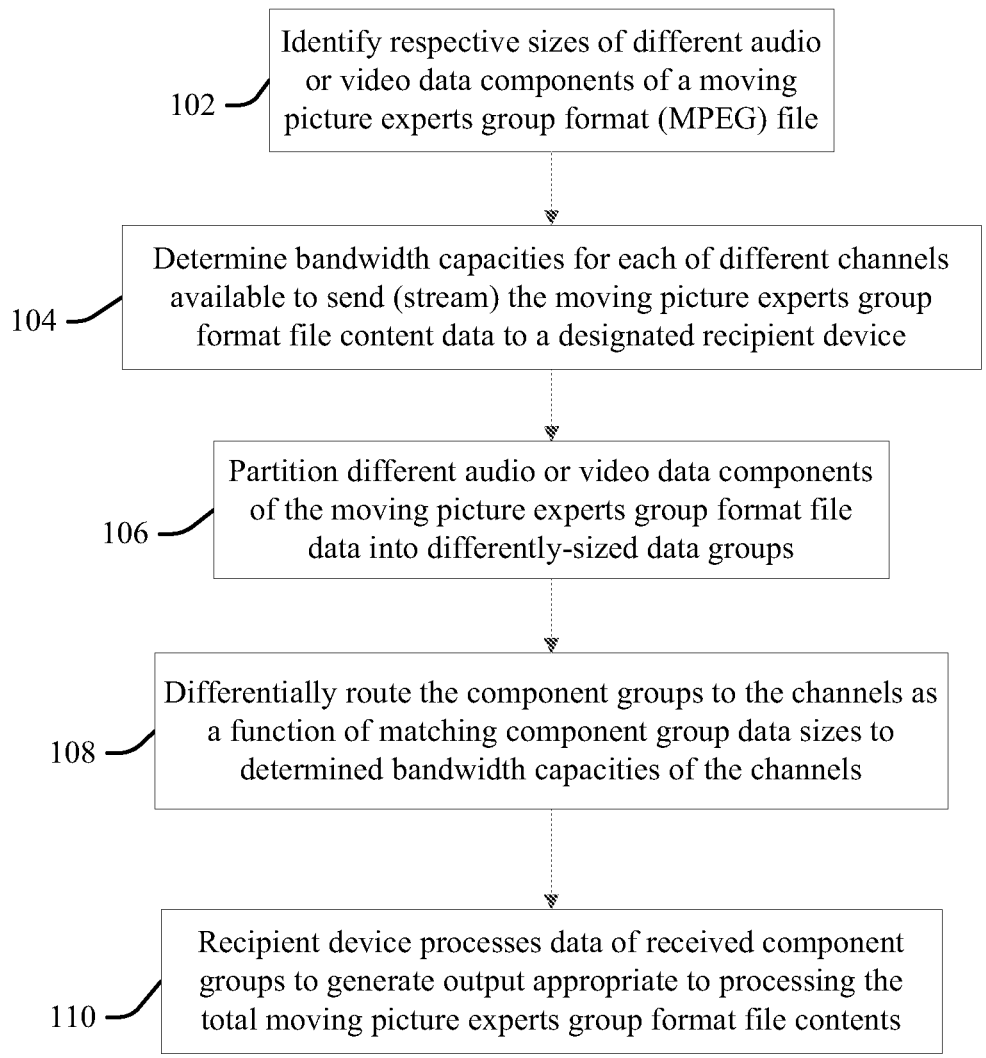
FIG. 4 is a flow chart illustration of an embodiment of the present invention.

FIG. 4 illustrates a multi-bit rate component sharding device according to the present invention. At 102 a processor configured according to an aspect of the present invention (the "configured processor") identifies the respective sizes of different audio or video data components of a Moving Picture Experts Group (MPEG) file.

At 104 the configured processor determines bandwidth capacities for each of a plurality of different telecommunication channels or mediums that are available to send (stream) the MPEG file content data to a designated recipient device. A wide variety of telecommunication channel options are available to stream data to user recipient devices within residential homes, businesses and other locations: illustrative but not limiting or exhaustive examples include coaxial cable used to carry cable television and internet data; copper wiring used to supply electrical power to outlets, telephone services; wide-area network (WAN) and local area network (LAN) ethernet; localized and regional wireless fidelity (WiFi); cellular data services; and still others will be apparent to one skilled in the art.

At 106 the configured processor "shards" (partitions, stratifies and/or splits) the different audio or video data components of the MPEG file apart into differently sized data groups (pluralities of packets of data).

In some aspects the configured processor combines the processes of 104 and 106 and functions as a beacon dispatcher at 104, accepting speed test results that are generated by the execution of embedded software to determine multimodal speed for each of a plurality of different telecommunication channels identified as specific gateways to reach the recipient device, including of an external transfer point such as a cellular data network (for example, LTE, 4G, Edge, etc.) The tests are performed (or determined) over a period of time anticipated as required to transfer an entirety of the amount of data of each of the different data partitions generated at 106, so that the speeds are forecast for the equivalent future time periods necessary to send the respective chunks of streaming data on each of the tested channels.

At 108 the configured processor differentially routes the sharded component groups to individual ones of the plurality of different telecommunication channels as a function of matching the different respective data sizes of the shards to the respective determined bandwidth capacities of each of the channels that are available to send the MPEG file content to the designated recipient device. More particularly, the shards are allocated to different channels of a network of channels that offer multimedia bit rates matching the size or profile data of each shard, to thereby optimize presentation of the shard at the receiving end without lags, buffering or other bandwidth-related problems.

At 110 the recipient device processes the data of the received, sharded components of the MPEG file to generate an output appropriate to processing the MPEG file content data in total, thus, as if the file was transferred and received as a whole. Thus, at 108 a recipient decoder may present audio and video content of the MPEG file to a viewer, which may include reconstituting the MPEG file in part of whole, recombining some or all of the shards as necessary (for example, combining individual image data shards to generate an image, or combining individual audio data shards to generate a composite song or other discrete audio content portion, etc.).

Some embodiments of the present invention allocate individual media files generated from camera and microphone devices inputs from live streaming events by partitioning them to specific parts of a telecommunication grid plurality of available channels that have the bandwidths that meet the best quality requirements of the individual media files: routing smaller files to lower bandwidth channels, reserving the best, highest quality (largest and most stable bandwidth) channels for the shards that are largest or have the most demanding MPEG profile format, avoiding the buffering and lagging endemic to prior art methodology that routes all the data of an MPEG file to a currently-selected channel that may not have the reliable bandwidth capability to handle the entirely of the MPEG file data on a timely basis.

In one embodiment the configured processor at 102 identifies the respective sizes of different audio or video data components of the MPEG file by parsing the text content of a M3U8 file to identify the profile data of each of a plurality different multimedia MPEG-4 files referenced by pointers within parsed text content; defines the partitions at 106 as the individual MPEG-4 files referenced by the pointers; and at 108 routes the individual file partitions to respective channels that have the bandwidth to serve data sizes indicated by the respective MPEG-4 standard profile code values of the partitioned files.

More particularly, M3U8 (or MP3 URL) files are "Moving Picture Experts Group Audio Layer 3 Uniform Resource Locator" files of plain text content (generally identified by file extension ".m3u" or ".m3u8") that contain pointers to individual multimedia MPEG-4 files that container video and audio and have varying profile bit rates for playback on an appropriate "codec" of the recipient device, wherein the codec is a device or computer program for encoding or decoding a digital data stream or signal. M3U8 files are generally used by audio and video players and other devices to describe where individual media files are located. For example, one M3U8 file may give references to the locations of a plurality of different online MP3 audio files for different songs streamed to a subscriber of an internet radio station. An M3U8 file can use absolute paths, relative paths, and URLs to refer to specific media files and/or entire folders of media files. Other text information in an M3U8 file may be comments that describe the contents. The M3U8 file extension is used to show that the file is in fact using UTF-8 character encoding. UTF stands for "Unicode Transformation Format," wherein the "8" means it uses 8-bit blocks to represent a character, and wherein the number of blocks needed to represent a character varies from 1 to 4.

Individual media files referenced by an M3U8 file include a variety of forms of MPEG files, in different standards, including MPEG-1, MPEG-2 and MPEG-4, and the different standards each consist of different parts, profiles and levels. MPEG profiles generally define a set of available tools, and MPEG levels define the range of appropriate values for the properties associated with the profile tools. MPEG standards use multiple bit rate encodings for a media source, and thus embodiments select channels at 108 for each MPEG file "shard" that are predicted to have enough bandwidth to support the bit rate encoding of the standard profile of the shard. More particularly, the MPEG-1 standard includes the MPEG-1 Audio Layer III (MP3) audio compression format, and is used for the coding of moving pictures and associated audio for digital storage media. Known as a lossy file format, it is commonly limited to about 1.5 Mbit/s, although the specification is capable of higher bit rates. To meet a low bit requirement, MPEG-1 down-samples images, and uses picture rates of only 24-30 Hz, resulting in a moderate quality relative to other standards.

The MPEG-2 standard is commonly used for generic coding of moving pictures and associated audio information, including the transport, video and audio standards for broadcast-quality television. MPEG-2 supports interlacing and high definition television streaming, and incorporates a different standard, MPEG-3, for standardizing scalable and multi-resolution compression.

The MPEG-4 standard is generally used for coding of audio-visual objects. Relative to MPEG-2, MPEG-4 uses further coding tools with additional complexity to achieve higher compression factors as well as more efficient coding of video. H.264 or MPEG-4 Part 10, Advanced Video Coding (MPEG-4 AVC) denotes block-oriented, motion-compensation-based video compression standards that are commonly used for recording, compression, and distribution of video content, and support resolutions up to 8192×4320, including 8K Ultra-High Definition (UHD). A H.264/AVC standard is capable of providing good video quality at substantially lower bit rates than previous standards (for example, half or less the bit rate of MPEG-2, H.263, or MPEG-4 Part 2).

The H.264 standard comprehends a number of different profiles that that define different capabilities targeting specific classes of applications, and generally have different bandwidth requirements. The profiles are differentially declared by profile code values (for example, "profile_idc") used for selection of an appropriate codec in the recipient receiver, and embodiment of the present invention route individual files by matching the profile code values to the determined bandwidths of the available channels. For example, where the "xx" value designates the appropriate AVC level, the value of "avc1.42E0xx" designates a "baseline profile"; "avc1.4D40xx" designates a "main profile" that requires greater bandwidth for satisfactory file transmission to a recipient relative to the baseline profile file; and "avc1.6400xx" designates a "high profile" that requires greater bandwidth for satisfactory file transmission to a recipient relative to the baseline and main profiles. Further an "MPEG-4 Visual Simple Profile Level 0" is designated by the profile code value of "mp4v.20.9"; MPEG-4 Visual Advanced Simple Profile Level 0 is designated by "mp4v.20.240"; and audio Codecs for MPEG-4 for a low-complexity AAC, designated by "mp4a.40.2."

The baseline profile is used in videoconferencing and mobile applications, and includes features used for loss robustness (or for other purposes such as low-delay multipoint video stream compositing). The main profile is used for standard-definition digital TV broadcasts that use the MPEG-4 format, for example, as defined in the DVB standard. The high profile is used for broadcast and disc storage applications, particularly for high-definition television applications (for example, this is the profile adopted by the Blu-ray Disc storage format and the DVB HDTV broadcast service).

A specific recipient decoder decodes at least one, but not necessarily all H.264 profiles. The decoder specification describes which profiles can be decoded. For example, if a recipient codec supports only the common subset of the coding tools of the baseline profile and the main profile at level 2.1 and below, the profile-level-id becomes "42E015," in which "42" stands for the Baseline profile, "E0" indicates that only the common subset for all profiles is supported, and "15" indicates level 2.1.

In another embodiment of the present invention the configured processor at 102 identifies the respective sizes of different audio or video data portions of a single MPEG-4 file, and partitions the file audio and video data portions into separate files at 106: audio content into separate audio (sound) files of a sound file format designated by the ".wav" extension; and image content into separate image files of an image file format designated by the ".bmp" or ".gif", etc., extension. Thus, the configured processor routes the individual files at 108 to respective channels that have the bandwidth to adequately transfer (without gaps or lags, etc.) the respective partitioned file sizes.

Thus, the MPEG-4 file is then split into a number "N" of sound data splits and a number "M" image data splits, generating a total of "M+N" segments of content to stream for the totality of the content of the original MPEG-4 file. Some embodiments of the present invention optimize the download of the streaming multimedia file by stratifying the audio content into a first ("N") plurality of partitions and the video content into another, second ("M") plurality of stratifications, where M+N is equal to the number "B" of available telecommunication channel options.

As will be appreciated by one skilled in the art, a phantom or dummy variable is created for a predictive model to hold a state of a complex variable for regression. Some embodiments of the present invention use phantom variable to hold a value of bandwidth (or other networking parameter) for a specific one of the "B" channels, in order to help determine how to optimize and set the flow of data over the network defined by the plurality of "B" channels.

MPEG streaming data standards use multiple bit rate encodings, generally selecting the highest bit rate encoding available that is supported by the bandwidth capacities of the communication medium used to stream the data, or the download capacities of the downstream communication media or devices transmitting or receiving the data. Problems arise when low bit rate or low quality encoding is chosen in response to determining low bandwidth capacities downstream. For example, the performance of speech recognition or computer vision algorithms may be slowed, causing pauses or lags unacceptable to an end-user. The presentation of High-Definition (HD) or Ultra HD content on audio-video devices may be impacted, causing presentation of image and audio content to pause, or wherein image content may be rendered on a display screen rasterized, incomplete or at lower standard or quality of definition.

Under the prior art, streaming content bit rate is dynamically adjusted based on determining end user-to-host bandwidth. When lower bit rates are selected to match limited bandwidths, data processing and multimedia quality may drastically suffer, causing speech recognition and other cognitive algorithms to lose accuracy, and video data renderings and visualization to become pixelated. In contrast, embodiments of the present invention enable streaming multimedia data to be split into different components to optimize the delivery of streaming content to devices, ensuring the delivery of high bit rate and otherwise high quality data to computer vision, sound processing, high definition video devices and algorithms, and other recipient, end-user applications.

Embodiments leverage the large number of options of content delivery available to homes, businesses and other locations, including extending data transmission capacities to deploying data services on available wired asset mediums that were not originally intended for digital data transmission (power lines, telephone lines, coaxial cable, etc.). The embodiments intelligently and automatically allocate select which audio partition or video stratification component is routed to onto which available communication medium or network mode. Embodiments may also suggest other network options or modalities for adding into a current networking audio partition and video stratification structure or environment.

It is noted that in the prior art "sharding" generally refers to database management, wherein a database shard is a horizontal partition of data in a database or search engine, and each individual partition is referred to as a shard or database shard, with each shard held on a separate database server instance, database server, or physical location, in order to spread load, or for other database management reasons. Horizontal partitioning is a database design principle whereby rows of a database table are held separately, rather than being split into columns as in normalization and vertical partitioning, and thus each horizontal partition may form part of a shard. Database sharding is complex, and presents disadvantages, including a relatively heavy reliance on interconnect structures between servers; increased data access latency (for example, in response to a query more than one shard must generally be searched, and as data or indexes are often only sharded in one way, while some searches are optimized, others may be slow or impeded). Accordingly, one skilled is unlikely to look to database sharding methodology teachings for use or application in streaming digital data.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:
   identifying respective data sizes of each of a plurality of different moving picture experts group four (MPEG-4) data files that have locations referenced by plain text data content of a moving picture experts group format audio layer 3 uniform resource locator file, wherein the MPEG-4 data files comprise audio data or video data;
   determining bandwidth capacities for each of a plurality of different telecommunication channels that are each available to send moving picture experts group format file content data to a designated recipient device;
   partitioning a totality of content data of the moving picture experts group format audio layer 3 uniform resource locator file into the plurality of MPEG-4 data files; and
   differentially routing each of the MPEG-4 data files to individual ones of the plurality of different channels as a function of matching the different respective data sizes of the MPEG-4 data files indicated by respective MPEG-4 standard profile code values of the different MPEG-4 files to the bandwidth capacities of each of the channels that are determined as available to send the moving picture experts group format file content to the designated recipient device.

2. The method of claim 1, wherein the determining the bandwidth capacities for each of the plurality of different telecommunication channels comprises:
   generating speed test results to determine multimodal speeds for each of the plurality of different channels over a period of time anticipated as required to transfer an entirety of an amount of data of a first of the MPEG-4 data files; and
   forecasting the determined bandwidth capacities for a future occurrence of the period of time that is necessary to send the first MPEG-4 data file to the designated recipient device on respective ones of the different telecommunication channels.

3. The method of claim 1, wherein the MPEG-4 standard profile code values indicate standard profiles for each file that are selected from the group consisting of a baseline profile, a main profile, a high profile, a visual simple profile level, a visual advanced simple profile level, and an audio codecs low-complexity level.

4. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the identifying the respective sizes of the different MPEG-4 data files, the determining the bandwidth capacities, the partitioning the totality of the content data of the moving picture experts group format file into the MPEG-4 data files, and the differentially routing the MPEG-4 data files.

5. The method of claim 4, wherein the computer-readable program code is provided as a service in a cloud environment.

6. The method of claim 1, wherein the MPEG-4 files comprise an audio data content file and a video data content file; and
   the method further comprising differentially routing the MPEG-4 data files to the individual channels as a function of matching data sizes of each of the audio file and the video file to the bandwidth capacities determined as available for each of the channels to adequately send the moving picture experts group format file content to the designated recipient device without gaps or lags.

7. The method of claim 6, further comprising:
   partitioning the totality of the content data of the moving picture experts group format audio layer 3 uniform resource locator file into a total number of the MPEG-4 data files that is equal to a total number of the channels.

8. The method of claim 7, wherein the determining the bandwidth capacities for each of the different telecommunication channels further comprises:
   setting the bandwidth value determined for a first of the channels as complex phantom variable; and
   determining an optimized flow for the plurality of channels as a function of a predictive model regression determined from the phantom variable.

9. A system, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   identifies respective data sizes of each of a plurality of different moving picture experts group four (MPEG-4) data files that have locations referenced by plain text data content of a moving picture experts group format audio layer 3 uniform resource locator file, wherein the MPEG-4 data files comprise audio data or video data;
   determines bandwidth capacities for each of a plurality of different telecommunication channels that are each available to send moving picture experts group format file content data to a designated recipient device;

partitions a totality of content data of the moving picture experts group format audio layer 3 uniform resource locator file into the plurality of MPEG-4 data files; and differentially routs each of the MPEG-4 data files to individual ones of the plurality of different channels as a function of matching the different respective data sizes of the MPEG-4 data files indicated by respective MPEG-4 standard profile code values of the different MPEG-4 files to the bandwidth capacities of each of the channels that are determined as available to send the moving picture experts group format file content to the designated recipient device.

10. The system of claim 9, wherein the processor executes the program instructions stored on the computer-readable storage medium via the computer readable memory and thereby:

generates speed test results to determine multimodal speeds for each of the plurality of different channels over a period of time anticipated as required to transfer an entirety of an amount of data of a first of the MPEG-4 data files; and forecasts the determined bandwidth capacities for a future occurrence of the period of time that is necessary to send the first MPEG-4 data file to the designated recipient device on respective ones of the different telecommunication channels.

11. The system of claim 9, wherein the MPEG-4 standard profile code values indicate standard profiles for each file that are selected from the group consisting of a baseline profile, a main profile, a high profile, a visual simple profile level, a visual advanced simple profile level, and an audio codecs low-complexity level.

12. The system of claim 9, wherein the MPEG-4 files comprise an audio data content file and a video data content file, and wherein the processor executes the program instructions stored on the computer-readable storage medium via the computer readable memory and thereby;

differentially routs the data groups to the individual channels as a function of matching the data size of each of the audio file and the video file to the bandwidth capacities determined as available for each of the channels to adequately send the moving picture experts group format file content to the designated recipient device without gaps or lags.

13. The system of claim 12, wherein the processor executes the program instructions stored on the computer-readable storage medium via the computer readable memory and thereby partitions the totality of the content data of the moving picture experts group format audio layer 3 uniform resource locator file into a total number of the MPEG-4 data files that is equal to a total number of the channels.

14. A computer program product for multi-bit rate component sharding, the computer program product comprising:

a computer readable storage medium having computer readable program code embodied therewith, wherein the computer readable storage medium is not a transitory signal per se, the computer readable program code comprising instructions for execution by a processor that cause the processor to:

identify respective data sizes of each of a plurality of different moving picture experts group four (MPEG-4) data files that have locations referenced by plain text data content of a moving picture experts group format file, wherein the MPEG-4 data files comprise audio data or video data;

determine bandwidth capacities for each of a plurality of different telecommunication channels that are each available to send moving picture experts group format file content data to a designated recipient device;

partition a totality of content data of the moving picture experts group format audio layer 3 uniform resource locator file into the plurality of MPEG-4 data files; and differentially rout each of the MPEG-4 data files to individual ones of the plurality of different channels as a function of matching the different respective data sizes of the MPEG-4 data files indicated by respective MPEG-4 standard profile code values of the different MPEG-4 files to the bandwidth capacities of each of the channels that are determined as available to send the moving picture experts group format file content to the designated recipient device.

15. The computer program product of claim 14, wherein the MPEG-4 standard profile code values indicate standard profiles for each file that are selected from the group consisting of a baseline profile, a main profile, a high profile, a visual simple profile level, a visual advanced simple profile level, and an audio codecs low-complexity level.

16. The computer program product of claim 14, wherein the MPEG-4 files comprise an audio data content file and a video data content file, and wherein the computer readable program code instructions for execution by the processor further cause the processor to;

differentially rout the MPEG-4 data files to the individual channels as a function of matching data sizes of each of the audio file and the video file to the bandwidth capacities determined as available for each of the channels to adequately send the moving picture experts group format file content to the designated recipient device without gaps or lags.

17. The computer program product of claim 16, wherein the computer readable program code instructions for execution by the processor further cause the processor to partition the totality of the content data of the moving picture experts group format audio layer 3 uniform resource locator file into a total number of the MPEG-4 data files that is equal to a total number of the channels.

* * * * *